United States Patent
Kim et al.

(10) Patent No.: US 9,259,702 B2
(45) Date of Patent: Feb. 16, 2016

(54) METHOD AND APPARATUS FOR SYNTHETIZING COMPOSITE USING SIMULTANEOUS VAPORIZATION, VAPORIZER FOR COMPOSITE SYNTHESIS APPARATUS, VAPORIZER HEATER, AND COMPOSITE

(71) Applicant: Korea Institute of Energy Research, Daejeon (KR)

(72) Inventors: Hee-Yeon Kim, Daejeon (KR); Seok-yong Hong, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 7 days.

(21) Appl. No.: 13/864,587

(22) Filed: Apr. 17, 2013

(65) Prior Publication Data
US 2013/0287643 A1  Oct. 31, 2013

(30) Foreign Application Priority Data

Apr. 30, 2012  (KR) .................. 10-2012-0045516

(51) Int. Cl.
*B01J 12/02* (2006.01)
*F22B 1/28* (2006.01)
*F22B 31/00* (2006.01)
*B01J 37/02* (2006.01)

(52) U.S. Cl.
CPC . *B01J 12/02* (2013.01); *F22B 1/28* (2013.01); *F22B 31/00* (2013.01); *B01J 37/0238* (2013.01)

(58) Field of Classification Search
CPC .................................... B01J 12/02; F22B 1/28
USPC ............ 422/129, 198, 305; 392/386; 219/209
See application file for complete search history.

(56) References Cited

U.S. PATENT DOCUMENTS

| | | | | |
|---|---|---|---|---|
| 3,372,297 A | * | 3/1968 | Pearsall Cortland S et al. | ............................ 313/337 |
| 3,435,623 A | * | 4/1969 | Tyree Lewis, Jr | ............. 62/50.2 |
| 3,725,010 A | * | 4/1973 | H.A. Penhast | .................. 422/64 |
| 4,460,673 A | | 7/1984 | Sukigara et al. | |

(Continued)

FOREIGN PATENT DOCUMENTS

| CN | 1356718 A | 7/2002 |
|---|---|---|
| JP | 11315988 A | 11/1999 |

(Continued)

OTHER PUBLICATIONS

Chinese Office Action dated Dec. 3, 2014 for counterpart Chinese Application No. 201310145648.3.

*Primary Examiner* — Walter D Griffin
*Assistant Examiner* — Huy-Tram Nguyen
(74) *Attorney, Agent, or Firm* — Westman, Champlin & Koehler, P.A.; Amanda M. Prose

(57) ABSTRACT

A composite synthesis method and apparatus, a vaporizer for the composite synthesis apparatus, a vaporizer heater and a composite. In the composite synthesis apparatus using simultaneous vaporization, two or more vaporizers are heated by heaters such that samples vaporized by the vaporizers are supplied into a reactor to synthesize a composite. The apparatus and method may prepare multiple-metal or metal-carbon heterogeneous composites, and may be applied to various metal- and carbon-based adsorbents, absorbents, gas/liquid separation membranes and various catalyst processes. Further, the composite may be applied to various industrial fields through change in metal components or carbon structures.

14 Claims, 4 Drawing Sheets

(56) References Cited

U.S. PATENT DOCUMENTS

| | | | | |
|---|---|---|---|---|
| 4,739,622 | A | * | 4/1988 | Smith ................................ 62/78 |
| 5,204,314 | A | * | 4/1993 | Kirlin et al. ................... 505/447 |
| 5,876,503 | A | * | 3/1999 | Roeder et al. ................. 118/715 |
| 5,964,585 | A | * | 10/1999 | Nakamura et al. .............. 431/32 |
| 6,451,692 | B1 | * | 9/2002 | Derderian et al. ............ 438/680 |
| 6,473,563 | B2 | * | 10/2002 | Takamatsu et al. ........... 392/388 |
| 6,734,405 | B2 | * | 5/2004 | Centanni et al. ............. 219/628 |

FOREIGN PATENT DOCUMENTS

| | | |
|---|---|---|
| JP | 2007138205 A | 6/2007 |
| JP | 2007290949 A | 11/2007 |
| KR | 10-2000-0057279 A | 9/2000 |
| KR | 102011013999 A | 12/2011 |
| WO | 98/23787 A1 | 6/1998 |

\* cited by examiner

METHOD AND APPARATUS FOR SYNTHETIZING COMPOSITE USING SIMULTANEOUS VAPORIZATION, VAPORIZER FOR COMPOSITE SYNTHESIS APPARATUS, VAPORIZER HEATER, AND COMPOSITE

CROSS-REFERENCE TO RELATED APPLICATION(S)

This Application claims priority to Korean Patent Application No. 10-2012-0045516, filed on Apr. 30, 2012.

BACKGROUND

1. Technical Field

Embodiments of the invention relate to a composite synthesis method and apparatus, a vaporizer for the composite synthesis apparatus, a vaporizer heater and a composite. More particularly, embodiments of the invention relate to a composite synthesis method and apparatus for synthesizing two or more different samples, a vaporizer for the composite synthesis apparatus, a vaporizer heater, and a composite.

2. Description of the Related Art

In recent years, a technology for effectively decorating metal catalyst particles for effective preparation of multiple-metal catalysts or a technology for effectively alloying multiple-metal catalysts for improvement in reaction activity or durability has attracted attention. In addition, a technology for preparing a carbon-based nano metal catalyst structure to improve reaction activity or durability, and incinerating carbon to recover or recycle metal components after reaction has also attracted attention.

Korean Patent Publication 10-2011-0139994A discloses a method of preparing a lithium manganese oxide-carbon nano composite through mixing in an ionic solution (entitled "Lithium manganese oxide-carbon nano composite and method of producing the same"). In this patent, the preparation of the composite requires several stages including solution reaction, crystal growth, strong acid/strong alkali treatment for removal of template components, heat treatment for alloying, and the like.

BRIEF SUMMARY

It is an aspect of the present invention to provide an apparatus for effectively synthesizing a composite based on simultaneous vaporization and a composite synthesis method using the same.

In accordance with one aspect of the invention, a composite synthesis apparatus using simultaneous vaporization includes: a first vaporizer which vaporizes a first sample for synthesis; a second vaporizer which vaporizes a second sample to be reacted with the first sample; a first heater which heats the first vaporizer; a second heater which heats the second vaporizer; and a reactor to which the first sample and the second sample vaporized by the first vaporizer and the second vaporizer are supplied to synthesize a composite.

The apparatus may further include a reaction gas supplier supplying a reaction gas to the reactor for reaction between the first sample and the second sample, and may further include a recycler returning unreacted gas discharged from the reactor to the reactor.

The apparatus may further include a gas supplier supplying gas for vaporizing the first sample and the second sample to the first vaporizer and the second vaporizer.

The first vaporizer may include: a sample supply section formed at one side of the main body and supplying the first sample; a gas supply section formed at another side of the main body and supplying gas for vaporizing the first sample; and a discharge section formed at an upper portion of the main body and discharging the vaporized first sample.

The second vaporizer may include: a sample supply section formed at one side of the main body and supplying the second sample; a gas supply section formed at another side of the main body and supplying gas for vaporizing the second sample; and a discharge section formed at an upper portion of the main body and discharging the vaporized second sample.

The main body may be formed of a vitreous material such as Pyrex or quartz.

The apparatus may further include a stopcock provided to the gas supply section or the discharge section and preventing the first or second sample from contacting air.

The first sample may be a solid precursor or a liquid precursor, and the first sample and the second sample may be comprised of different metals.

One of the first sample and the second sample may be a metal and the other sample may be an organic material.

The first heater may be an oven accommodating and heating the first vaporizer therein.

The first heater may include: a body having a space to accommodate the first vaporizer therein; a heat wire disposed inside the body and heating the first vaporizer; and a fan circulating air inside the body.

The apparatus may further include: a connecting pipe connecting the first vaporizer and the reactor. The connecting pipe may be provided with a heat wire heating the vaporized sample passing through the connecting pipe.

In accordance with another aspect of the invention, a vaporizer for a composite synthesis apparatus using simultaneous vaporization includes: a main body receiving a sample; a sample supply section formed at one side of the main body and supplying the sample; a gas supply section formed at another side of the main body and supplying gas for vaporizing the sample; and a discharge section formed at an upper portion of the main body and discharging the vaporized sample.

The main body may include a vitreous material such as Pyrex or quartz.

The vaporizer may further include: a stopcock provided to the gas supply section or the discharge section and preventing the sample from contacting air.

The sample may be a solid precursor or a liquid precursor. The sample may be a metal or an organic material.

In accordance with a further aspect of the invention, a vaporizer heater for a composite synthesis apparatus using simultaneous vaporization includes: a body having a space to accommodate a vaporizer which receives and vaporizes a sample therein; a heat wire disposed inside the body and heating the vaporizer; and a fan circulating air inside the body.

In accordance with yet another aspect of the invention, a composite is prepared by the composite synthesis apparatus using simultaneous vaporization.

In accordance with yet another aspect of the present invention, a composite synthesis method using simultaneous vaporization includes: heating a first sample to be vaporized; heating a second sample to be vaporized; and synthesizing the vaporized first and second samples in a reactor.

Each of the vaporizing a first sample and the vaporizing a second sample may include: supplying the first sample or the second sample to a vaporizer; supplying gas to the vaporizer to vaporize the corresponding sample; heating the vaporizer; and discharging the heated first sample or the heated second sample.

The first sample and the second sample may be heated inside a closed heater. The method may further include recycling emission discharged from the reactor, to which the first sample and the second sample are supplied to synthesize a composite, to the reactor.

BRIEF DESCRIPTION OF THE DRAWINGS

The above and other aspects, features and advantages of the present invention will become apparent from the following description of embodiments given in conjunction with the accompanying drawings, in which.

DETAILED DESCRIPTION

Embodiments of the present invention will now be described in more detail with reference to the accompanying drawings of FIGS. 1 to 4.

Figure 1:
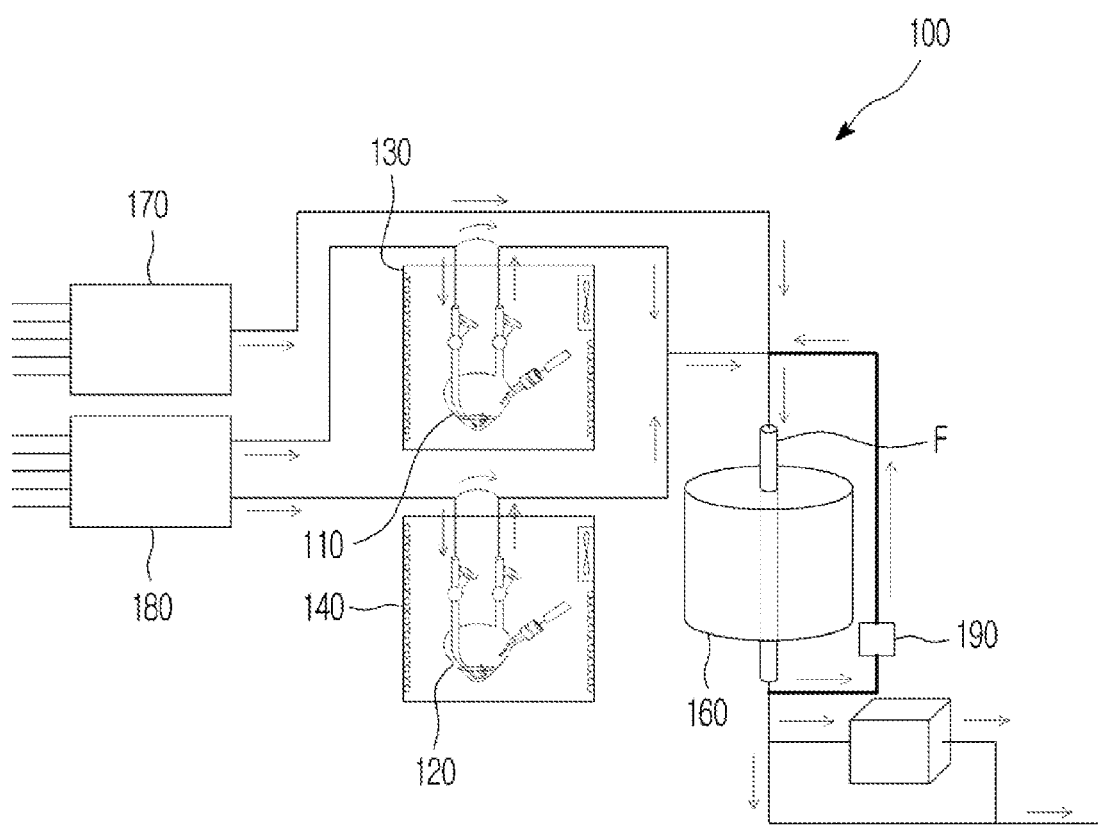
FIG. 1 is a block diagram of a composite synthesis apparatus according to one embodiment of the present invention.

Referring to FIG. 1, a composite synthesis apparatus 100 using simultaneous vaporization according to one embodiment of the invention includes a first vaporizer 110, a second vaporizer 120, a first heater 130, a second heater 140, a reactor 160, a reaction gas supplier 170, a gas supplier 180, and a recycler 190.

Figure 2:
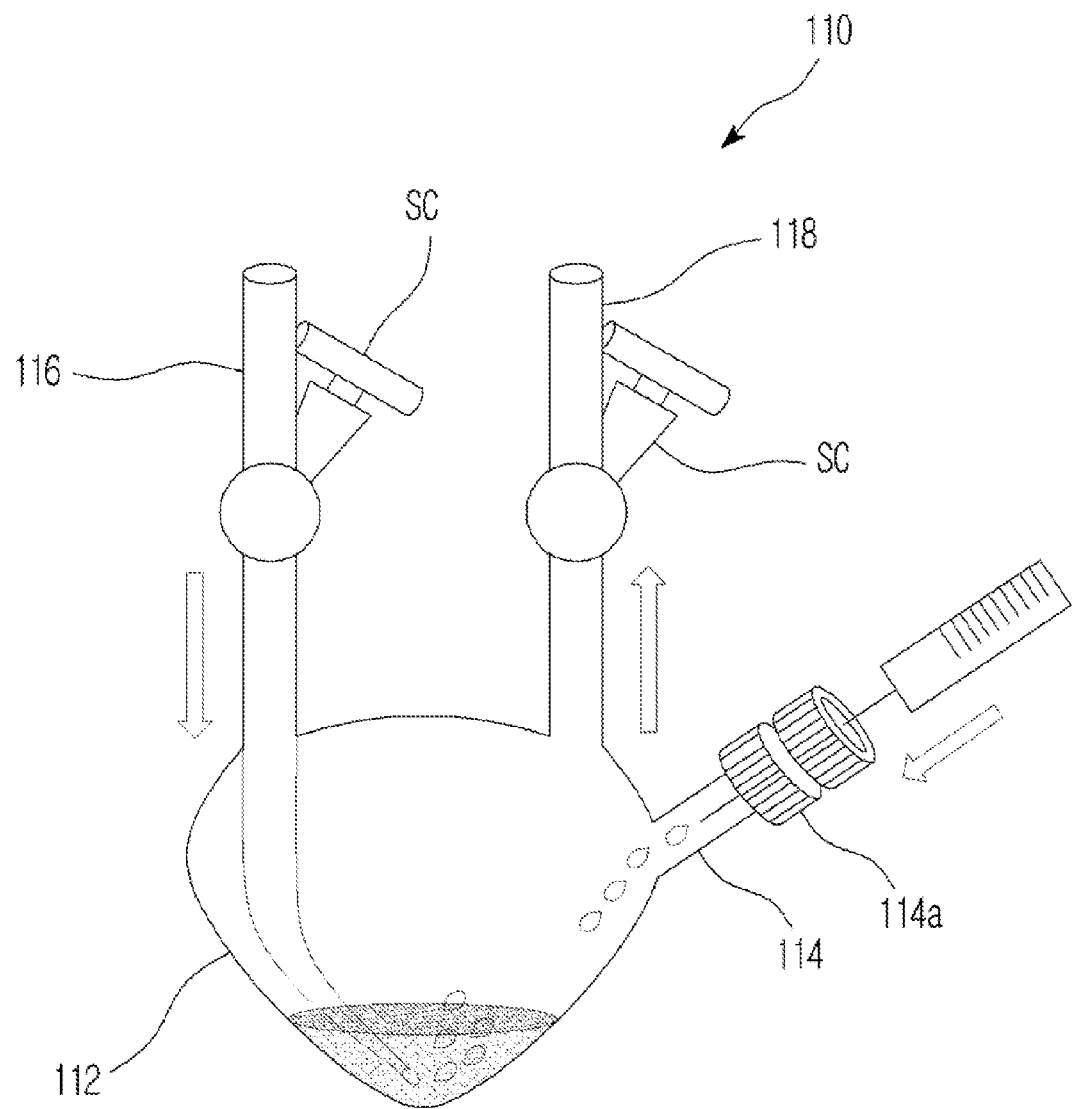
FIG. 2 is a schematic view of a vaporizer for the composite synthesis apparatus according to the embodiment of the present invention, in which a liquid sample is injected into the vaporizer.
Figure 3:
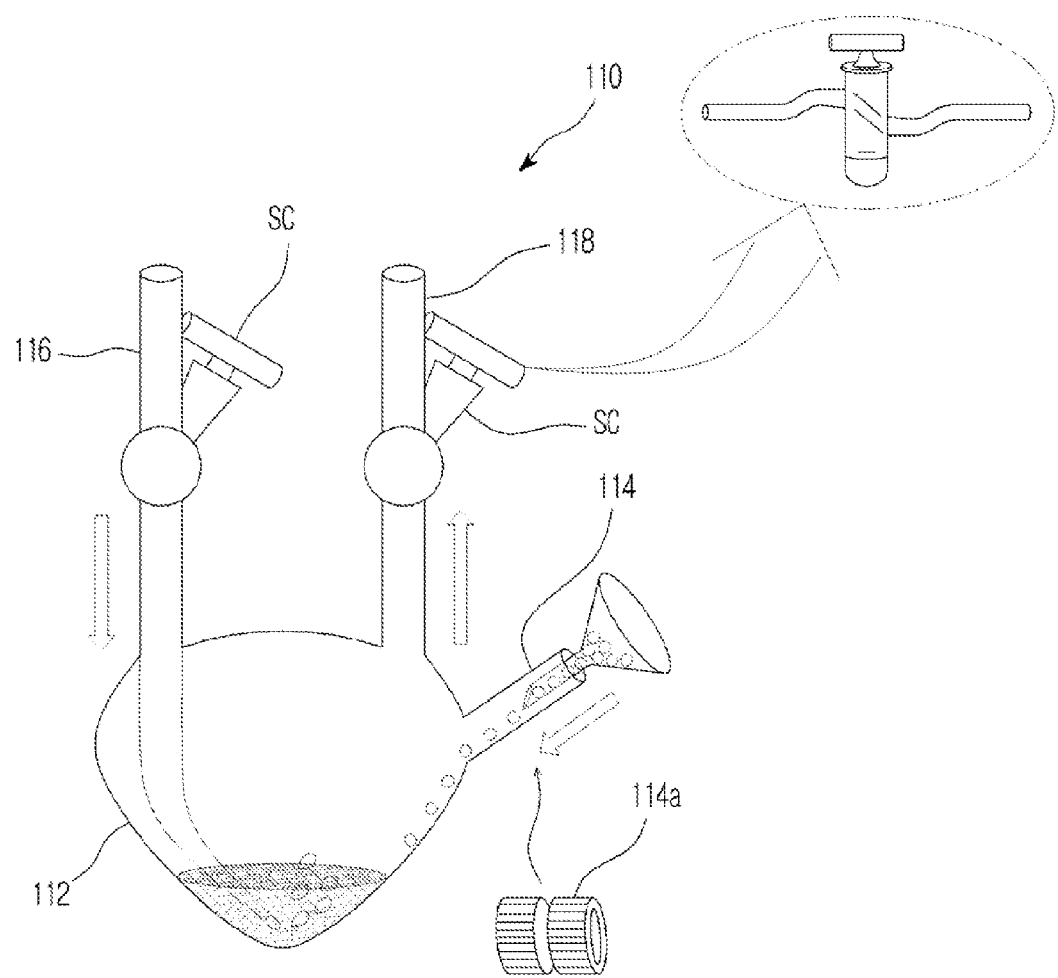
FIG. 3 is a schematic view of a vaporizer for the composite synthesis apparatus according to the embodiment of the present invention, in which a solid sample is supplied to the vaporizer.

Referring to FIGS. 2 and 3, each of the first and second vaporizers 110, 120 includes a main body 112, a sample supply section 114, a gas supply section 116, a discharge section 118, and a stopcock (SC).

The main body 112 has a space receiving a sample therein, and may be made of a transparent material to check the state and the remaining amount of a sample therein. Further, the sample used in this embodiment is a precursor that can react with an organic material or metal, and thus the main body 112 may be made of a stable material appropriate for the sample. In one embodiment, the sample may be made of a vitreous material such as Pyrex, quartz or the like.

The sample supply section 114 is connected to one side of the main body such that a sample can be supplied to the main body from the outside. Further, the sample supply section 114 is provided at one end thereof with a sealing member 114a for sealing the main body 112. The sealing member 114a may be formed with a septum made of Teflon and the like.

Samples supplied to the first and second vaporizers 110, 120 may be a solid precursor and a liquid precursor, respectively. When a solid precursor is supplied to the first vaporizer 110 or the second vaporizer 120, the sealing member 114a is separated from the sample supply section 114, solid precursor powder is placed in the sample supply section 114, and then the sealing member 114a is mounted again on the sample supply section 114. Thus, after the solid precursor is supplied to the first vaporizer 110 or the second vaporizer 120, the inside of the main body 112 is prevented from contacting external air.

In the case where a liquid precursor is supplied to the first vaporizer 110 or the second vaporizer 120, after nitrogen is supplied to the main body 112 to provide a nitrogen atmosphere, the liquid precursor may be supplied to the main body 112 using an airtight syringe or the like through the septum formed on the sealing member 114a and made of Teflon.

Further, the gas supply section 116 serves to supply gas from the gas supplier into the main body 112. Thus, as shown in FIGS. 2 and 3, the gas supply section 116 is connected to an upper portion of the main body 112. The supplied gas is provided for vaporizing a first sample or a second sample which is in a solid or liquid state.

The discharge section 118 serves to discharge the vaporized sample. Referring to FIGS. 2 and 3, the discharge section 118 is connected to an upper portion of the main body 112. Thus, the discharge section 118 is connected to the reactor 160 so that the sample vaporized in the main body 112 can move to the reactor 160 via the discharge section 118.

Referring to FIG. 3, the stopcocks (SC) are provided to the gas supply section 116 and the discharge section 118, respectively. Thus, the stopcock (SC) can isolate the inside of the main body 112 from the gas supplier or the reactor 160. Since a metal or hydrocarbon-based organic precursor may be changed in quality due to contact with air, such an isolated configuration prevents external air from contacting the sample before and after the sample is supplied to the main body 112.

That is, in the case where the liquid precursor is supplied to the main body 112, the stopcock (SC) provided to the gas supply section 116 is closed after nitrogen is supplied from the gas supplier into the main body 112 via the gas supply section 116 to generate a nitrogen atmosphere in the main body 112. As a result, nitrogen is not additionally supplied into the main body. In this case, the stopcock (SC) of the discharge section 118 may also be closed.

After vaporization of the sample, the stopcock (SC) of the discharge section 118 is opened to allow the vaporized sample to move into the reactor 160.

Here, a sample supplied to the first vaporizer 110 will be called a first sample, and a sample supplied to the second vaporizer 120 will be called a second sample. The first sample and the second sample may be interchanged when supplied to the reactor, and may be different metals or different metallic or hydrocarbon organic components.

Figure 4:
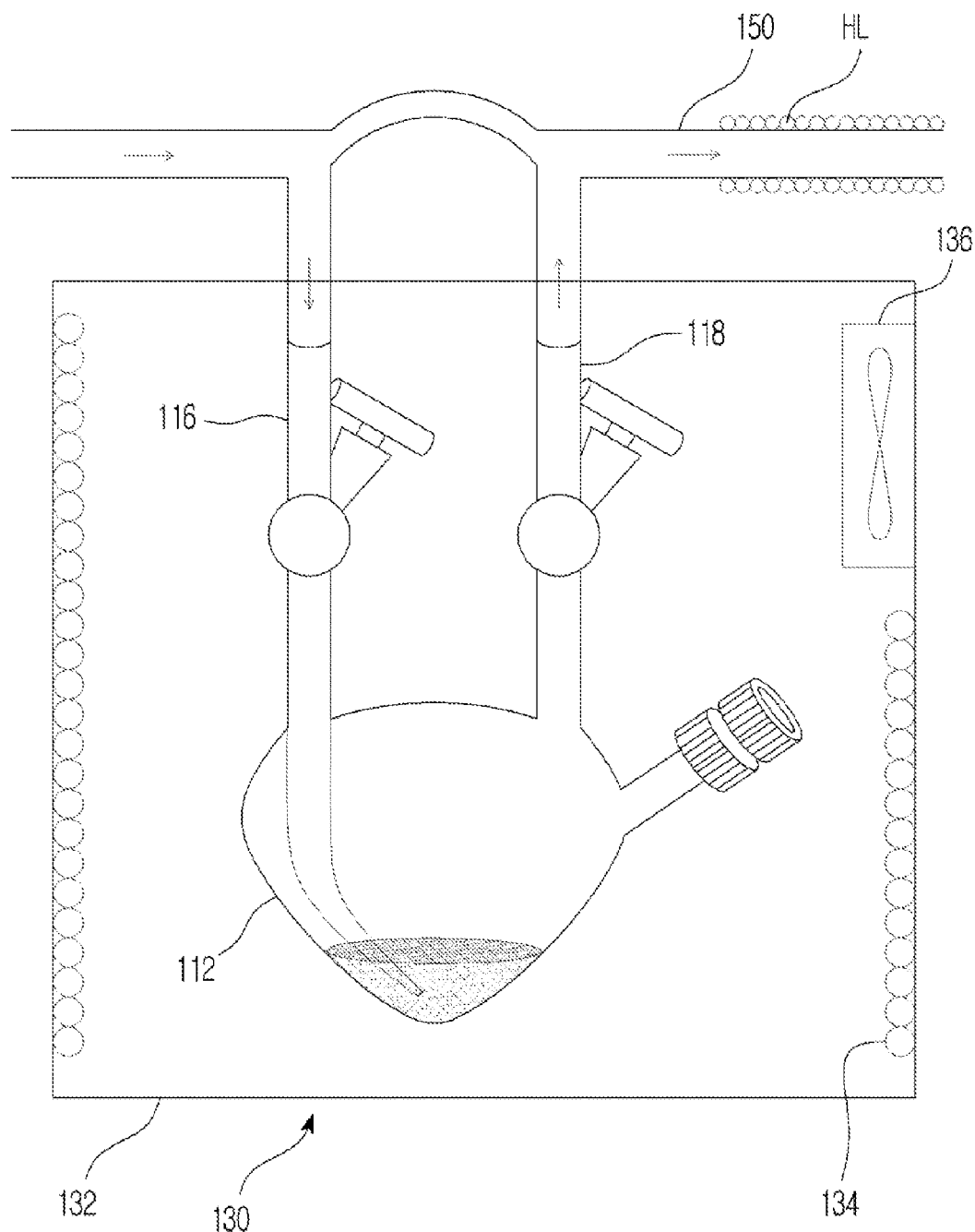
FIG. 4 is a schematic view of a heater for the composite synthesis apparatus according to the embodiment of the present invention.

Referring to FIG. 4, the first and second heaters 130, 140 are provided to heat the first and second vaporizers 110, 120, respectively. In this embodiment, both first and second heaters 130, 140 may be oven-type heaters. That is, each of the first and second heaters 130, 140 includes a body 132, a heat wire 134, and a fan 136.

The body 132 has a space to accommodate the first or second vaporizer 110 or 120 therein.

The heat wire 134 is arranged on an inner side of the body 132 and receives electric power from the exterior to generate heat, thereby heating the interior of the body 132.

The fan 136 circulates air within the body 132 such that the body 132 can have a constant inner temperature.

As described above, the first and second vaporizers 110, 120 are placed in and heated by the first and second heaters 130, 140, respectively, so that the main body 112, the sample supply section 114, the gas supply section 116 and the discharge section 118 of each of the first and second vaporizers 110, 120 can be heated to a constant temperature, as compared with a heating mantle manufactured in the form of a heating furnace or jacket, an isothermal heating bath in which the vaporizer is submerged, etc. Moreover, unlike the heating furnace, the vaporizers of the present invention do not suffer from temperature decrease in the first or second heater, so that there is no temperature variation due to difference in specific heat between the vaporizers. In addition, the heaters according to the embodiment of the invention may permit easy temperature control even at a low temperature of about 100° C. or less.

Further, each of the first and second vaporizers 110, 120 is connected to the reactor 160 via the connecting pipe 150. That is, the connecting pipe 150 is connected at one side thereof to an outlet of each of the first and second vaporizers 110, 120, and connected at the other side thereof to the reactor 160. Further, the connecting pipe 150 is provided with a heat wire (HL) to heat the connecting pipe 150, whereby the samples can be moved from the first and second vaporizers 110, 120 to the reactor 160 while maintained at constant temperatures.

This configuration is provided to allow gas to move to the reactor 160 without condensation while flowing in the connecting pipe 150. Thus, the connecting pipe 150 may have the same temperature as that of the first and second heaters 130, 140. Further, the connecting pipe 150 may be formed as short as possible.

In the reactor 160, the samples vaporized by the first and second vaporizers 110, 120 are collected. In addition to the samples vaporized by the first and second vaporizers 110, 120, a reaction gas is supplied from the reaction gas supplier 170 into the reactor 160 to cause reaction of the samples. As the reaction gas, oxygen or hydrogen may be used. In the case where oxygen or hydrogen can cause cohesion or side reaction, nitrogen may be used as the reaction gas.

Further, the reactor 160 is provided with a heater to control a reaction temperature to cause reaction of the vaporized samples. Accordingly, the reactor 160 may be made of quartz glass or Pyrex to allow an operator to observe the samples inside the reactor 160 while ensuring stable reaction between the samples. The reactor 160 may have various sizes, and may be oriented upright or horizontally.

Further, the reactor 160 may be provided therein with a filter F for collecting reactants, in which the filter F may be made of quartz glass or Pyrex.

The reaction gas supplier 170 supplies the reaction gas into the reactor 160. The reaction gas may include oxygen, hydrogen or nitrogen for activating reaction between the vaporized samples.

The gas supplier 180 is connected to the gas supply sections 116 of the first and second vaporizers 110, 120, and supplies gas for vaporizing the samples. At this time, nitrogen may be supplied.

That is, as shown in FIG. 1, the samples vaporized in the first and second vaporizers 110, 120 are mixed before reaching the reactor 160, and the reaction gas is supplied into the reactor 160 through the reaction gas supplier via a separate channel.

The reaction temperature in the reactor 160 may increase in the range from room temperature to a temperature of about 1100° C., whereby a metal-carbon heterogeneous composite or a multiple-metal hybrid composite can be prepared. Here, the reaction temperature can be increased up to about 1100° C. when the reactor is made of quartz glass. On the other hand, if the reactor is made of alumina or graphite, the reaction temperature may be increased to a higher temperature than that of the reactor made of quartz glass.

Unreacted gas may be discharged to the outside of the reactor 160 while passing through the reactor 160. Since precursors used in chemical vapor deposition or gas synthesis are typically expensive, it is not advisable to discharge the unreacted precursors directly. Thus, the apparatus may include the recycler 190 to return the unreacted gas discharged from the reactor 160 to the reactor 160 again.

The recycler 190 includes a recycling pump or a solenoid valve to return the unreacted gas discharged from the recycler 190 to the reactor 160 and to allow the unreacted gas to react again. Here, the apparatus may further include a release valve or the like to maintain pressure.

According to embodiments of the invention, it is possible to produce a multiple-metal or metal-carbon heterogeneous composite, which may be applied to various metal- and carbon-based adsorbents, absorbents, gas/liquid separation membranes, and various catalyst processes. As such, the composite may be applied to various industrial fields through change in metal components or carbon structures.

In addition, in the composite synthesis apparatus according to the embodiments, multi-metal hybrid composites, metal-carbon heterogeneous composites, and the like may be efficiently synthesized to have various properties only through temperature control for the reactor while supplying two or more precursors in a vaporized state.

Further, the present invention may permit mass production of composites through simple change in dimensions of the vaporizers and the apparatus without any separate design change.

Although some embodiments have been provided to illustrate the present invention, it should be understood that these embodiments are given by way of illustration only, and that various modifications, variations, and alterations can be made without departing from the spirit and scope of the present invention. The scope of the present invention should be limited only by the accompanying claims and equivalents thereof.

What is claimed is:

1. A composite synthesis apparatus using simultaneous vaporization, comprising:
   a first vaporizer which vaporizes a first sample for synthesis;
   a second vaporizer which vaporizes a second sample to be synthesized with the first sample wherein the vaporizers are configured for simultaneous vaporization of the first and second samples respectively;
   a first heater configured to heat the first vaporizer therein;
   a second heater configured to heat the second vaporizer therein, wherein the first and second heater are each configured to simultaneously heat the respective vaporizers contained therein and wherein the first and second sample are vaporized independently of one another; and
   a reactor to which a mixture of the first sample and the second sample vaporized by the first vaporizer and the second vaporizer is supplied, the reactor configured to synthesize a composite,
   a gas supplier supplying gas for vaporizing the first sample and the second sample to the first vaporizer and the second vaporizer, and
   wherein the first vaporizer and the second vaporizer each comprises:
   a main body receiving the sample;
   a sample supply section formed at one side of the main body, supplying the sample and provided at one end thereof with a sealing member for sealing the main body before and after supplying the sample;
   a gas supply section formed at another side of the main body, supplying gas for vaporizing the sample from the gas supplier and provided with a stopcock for isolating the inside of the main body from the gas supplier;

a discharge section formed at an upper portion of the main body, discharging the vaporized sample and provided with a stopcock for isolating the inside of the main body from the reactor; and wherein the first and second heater are each configured to receive a corresponding main body, sample supply section, gas supply section and discharge section therein and each heater thus configured to heat the main body, the sample supply section, the gas supply section and the discharge section therein for vaporizing the first and second samples respectively.

2. The apparatus according to claim 1, further comprising:
a reaction gas supplier supplying a reaction gas to the reactor for reaction between the first sample and the second sample.

3. The apparatus according to claim 1, further comprising:
a recycler returning unreacted gas discharged from the reactor to the reactor.

4. The apparatus according to claim 1, wherein the main body is made of a vitreous material including Pyrex or quartz.

5. The apparatus according to claim 1, wherein the first sample is a solid precursor or a liquid precursor.

6. The apparatus according to claim 1, wherein the first sample and the second sample are different metals.

7. The apparatus according to claim 1, wherein one of the first sample and the second sample is a metal and the other sample is an organic material.

8. The apparatus according to claim 1, wherein the first heater is an oven accommodating and heating the first vaporizer therein.

9. The apparatus according to claim 1, wherein the first heater comprises:
a body having a space to accommodate the first vaporizer therein;
a heat wire disposed inside the body and heating the first vaporizer; and a fan circulating air inside the body.

10. The apparatus according to claim 1, further comprising:
a connecting pipe connecting the first vaporizer and the reactor, the connecting pipe being provided with a heat wire heating the vaporized sample passing through the connecting pipe.

11. A vaporizer for a composite synthesis apparatus using simultaneous vaporization, comprising:
a main body configured to receive a sample;
a sample supply section formed at one side of the main body configured to supply the sample to the main body and provided at one end thereof with a sealing member configured for sealing the main body before and after supplying the sample;
a gas supply section formed at another side of the main body, configured for supplying gas for vaporizing the sample to the main body and provided with a stopcock;
a discharge section formed at an upper portion of the main body and configured to discharge the vaporized sample to a reactor configured to synthesize a composite, the discharge section comprising a stopcock; and
a heater configured to receive the main body the sample supply section, the gas supply section and the discharge section therein and to heat the main body, the sample supply section, the gas supply section and the discharge section therein for vaporizing the sample.

12. The vaporizer according to claim 11, wherein the main body is made of a vitreous material including Pyrex or quartz.

13. The vaporizer according to claim 11, wherein the sample is a solid precursor or a liquid precursor.

14. The vaporizer according to claim 11, wherein the sample is a metal or an organic material.

* * * * *